US012654429B2

(12) United States Patent
Wen et al.

(10) Patent No.: US 12,654,429 B2
(45) Date of Patent: Jun. 16, 2026

(54) 5G ANTENNA HOUSING WITH FLAME RETARDANT PROPERTIES

(71) Applicant: SABIC GLOBAL TECHNOLOGIES B.V., Bergen op Zoom (NL)

(72) Inventors: Liang Wen, Shanghai (CN); Jing Guo, Shanghai (CN); Chaodong Jiang, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 122 days.

(21) Appl. No.: 18/278,946

(22) PCT Filed: Feb. 28, 2022

(86) PCT No.: PCT/EP2022/054921
§ 371 (c)(1),
(2) Date: Aug. 25, 2023

(87) PCT Pub. No.: WO2022/180266
PCT Pub. Date: Sep. 1, 2022

(65) Prior Publication Data

US 2024/0149567 A1 May 9, 2024

(30) Foreign Application Priority Data

Feb. 26, 2021 (WO) ................ PCT/CN2021/078218

(51) Int. Cl.
*B32B 27/08* (2006.01)
*B32B 27/20* (2006.01)
(Continued)

(52) U.S. Cl.
CPC .............. *B32B 27/08* (2013.01); *B32B 27/20* (2013.01); *B32B 27/304* (2013.01); *B32B 27/32* (2013.01);
(Continued)

(58) Field of Classification Search
CPC ....... B32B 27/08; B32B 27/20; B32B 27/304; B32B 27/32; B32B 27/365;
(Continued)

(56) References Cited

U.S. PATENT DOCUMENTS 4,399,054 A 8/1983 Ferraris et al.
4,472,524 A 9/1984 Albizzati
(Continued)

FOREIGN PATENT DOCUMENTS

EP 0994978 B1 10/2004
EP 0921919 B1 7/2005
(Continued)

OTHER PUBLICATIONS

International Search Report for International Application No. PCT/EP2022/054921, International Filing Date Feb. 28, 2022, Date of Mailing Apr. 19, 2022, 4 pages.
(Continued)

*Primary Examiner* — Gerard Higgins
(74) *Attorney, Agent, or Firm* — CANTOR COLBURN LLP

(57) ABSTRACT

A 5G antenna and its 5G antenna housing includes: an outside shell made of a polymer composition containing a polymer selected from polyethylene (PE), polycarbonate (PC), polypropylene (PP), ethylene based elastomer grafted polypropylene and a combination thereof; and glass fiber, and an flame retardant film (3) having a rating of at least VTM2 and placed on an inner surface of the outside shell such that the flame retardant film is between the outside shell and the 5G antenna.

15 Claims, 1 Drawing Sheet

(51) Int. Cl.

| | |
|---|---|
| ***B32B 27/30*** | (2006.01) |
| ***B32B 27/32*** | (2006.01) |
| ***B32B 27/36*** | (2006.01) |
| *H01Q 1/42* | (2006.01) |
| *H01Q 1/50* | (2006.01) |

(52) U.S. Cl.
CPC ........ *B32B 27/365* (2013.01); *B32B 2250/02* (2013.01); *B32B 2262/101* (2013.01); *B32B 2307/3065* (2013.01); *B32B 2307/546* (2013.01); *B32B 2307/7376* (2023.05); *H01Q 1/42* (2013.01); *H01Q 1/50* (2013.01)

(58) Field of Classification Search
CPC .......... B32B 2250/02; B32B 2262/101; B32B 2307/3065; B32B 2307/546; B32B 2307/7376
See application file for complete search history.

(56) References Cited

U.S. PATENT DOCUMENTS

| | | | | |
|---|---|---|---|---|
| 5,017,714 | A | 5/1991 | Welborn, Jr. | |
| 5,324,820 | A | 6/1994 | Baxter | |
| 2014/0007994 | A1 | 1/2014 | Sakamoto et al. | |
| 2014/0243467 | A1 * | 8/2014 | Dern | C08K 7/14 524/508 |
| 2017/0190884 | A1 | 7/2017 | Yun et al. | |
| 2018/0215901 | A1 | 8/2018 | Kurokawa et al. | |

FOREIGN PATENT DOCUMENTS

| | | | |
|---|---|---|---|
| EP | 1852938 | B1 | 4/2010 |
| WO | 2006010414 | A1 | 2/2006 |
| WO | 2017118619 | A1 | 7/2017 |
| WO | 2019105815 | A1 | 6/2019 |

OTHER PUBLICATIONS

Ser van der Ven, "Polypropylene and other Polyolefins: Polymerization and Characterization," Studies in Polymer Science 7, Elsevier (1990), pp. 1-11.

Written Opinion for International Application No. PCT/EP2022/054921, International Filing Date Feb. 28, 2022, Date of Mailing Apr. 19, 2022, 5 pages.

* cited by examiner

5G ANTENNA HOUSING WITH FLAME RETARDANT PROPERTIES

CROSS REFERENCE TO RELATED APPLICATIONS

This application is a National Stage application of PCT/EP2022/054921, filed Feb. 28, 2022, which claims the benefit of PCT application no. PCT/CN2021/078218, filed Feb. 26, 2021, both of which are incorporated by reference in their entirety herein.

TECHNICAL FIELD OF THE INVENTION

The present invention relates to a 5G antenna and its 5G antenna housing comprising flame retardant properties.

TECHNOLOGICAL BACKGROUND OF THE INVENTION

Antenna housings are used in antenna stations to provide protection on antennas from the environment. Therefore, it is desirable that the antenna housings are made of polymer compositions with sufficient stiffness and a high low temperature impact resistance to withstand extreme weathers, e.g. gales or hail. Another common requirement on the polymer compositions to be used in antenna housing is light color for an aesthetic reason as antennas are often installed in high places, a light color better matches the color of the sky and this color must to have good UV aging performance. Another common requirement on the polymer compositions to be used in antenna housing is excellent flowability as the pieces of antenna housing are usually large and prepared by injection molding where excellent flowability is crucial to have the polymer composition fully filled the mold during the injection molding process. Measurement methods of flowability are known in the art, e.g. melt flow index (MFI) measurement and spiral flow measurement. In the context of the present invention, excellent flowability refers to excellent result in spiral flow measurement because spiral flow measurement represents better the flowability than MFI measurement under the injection molding condition.

Antenna housings based polymer compositions comprising polypropylene are known in the art, for instance:

EP 1852938 B1 discloses an antenna housing comprising an electromagnetic window portion through which electromagnetic signals are passed in use, wherein a layer of a wall of the electromagnetic window is formed from self-reinforced polypropylene.

US 20170190884 A1 discloses a resin composition for a radar cover. The resin composition includes carbon nanotubes and a polymer resin. The resin composition does not interfere with the transmission of signals from a radar while protecting the radar from the surroundings.

In addition, nowadays, the fifth generation communication technology become an important trend. It requires higher data transmission rate, low signal loss. Polypropylene (PP) is a good option for antenna cover application as its low density allow to have a very low signal loss.

However, with the development of 5G technology, the power of base station become higher and higher which increase heat and fire hazard risk.

Therefore there is a need for a 5G antenna housings having sufficient stiffness and a high low temperature impact resistance to withstand extreme weathers, an excellent flowability as the pieces of antenna housing are usually large and prepared by injection molding and having flame retardance (FR) performance of at least VTM2/V2, preferably VTM1/V1, preferably, VTM0/V0 according to UL94VTM/UL94Vertical Burn test standard. In the context of the present invention "I" means "and/or".

SUMMARY

This object is achieved by the present invention and relates to an 5G antenna housing (1) comprising:

(a) an outside shell (2) made of a polymer composition comprising at least:
   a polymer selected from a list comprising: Polyethylene (PE), Polycarbonate (PC), Polypropylene (PP), Ethylene based elastomer, Grafted polypropylene and a combination of those material,
   glass fiber,
(b) a flame retardant film (3) having a rating of at least VTM2 according to UL94 and placed on the inner side of the outside shell in order to be between the outside shell and the 5G antenna.

wherein the 5G antenna housing have at minimum the following performance according respectively:

High-current Arc ignition: ≤3 according to UL746A,
Hot wire ignition: ≤3 according to ASTM D3874,
Flex modulus: >2000 MPa according to ISO178,
IZOD impact at 23° C.: >10 KJ/m2 according to ISO180,
IZOD impact at −40° C.: >5 KJ/m2 according to ISO180.
Passing a falling ball test wherein the falling ball test is carried out from ≥0.6 m by ≥200 g ball,
Color change (ΔE) after UV 1000 h according to ISO4892-2 inferior to 50 according to GB 11186.2 on color-eye 7000A.

In an embodiment, the polymer of the polymer composition is:

Polyethylene (PE) having a MFR in the range from 0.1 to 100 dg/min as measured according to ISO1133 at 190° C. and 2.16 kg,
Polycarbonate (PC) having an MFR in the range from 0.1 to 100 dg/min as measured according to ISO1133 at 300° C. and 1.2 kg,
Polypropylene (PP) having a MFI of the polypropylene in the range from 0.1 to 75 dg/min, as measured according to ISO1133 at 230° C./2.16 kg, and a xylene soluble part of the polypropylene is in the range from 0.1 to 35 wt % as measured according to by ISO16152:2005,
Ethylene based elastomer having a MFI of the ethylene based elastomer in the range of 0.2 to 36 dg/min as measured according to ISO1133-1:2011 at 190° C./2.16 kg,
Grafted polypropylene having a MFI of the Grafted polypropylene in the range from 150 to 600 dg/min as measured according to ISO1133-1:2011 at 230° C./2.16 kg, or
Combination of polypropylene, ethylene based elastomer and/or grafted polypropylene
   a. wherein the amount of the polypropylene is in the range from 29.6 to 79.8 wt % based on the total amount of the polymer composition,
   b. and amount of grafted polypropylene is in the range from 1.2 to 3 wt % based on the total amount of the polymer composition.
   c. and the amount of the ethylene based elastomer is in the range from 3.2 to 28.3 wt % based on the total amount of the polymer composition.

In an embodiment, the amount of wherein the amount of the glass fiber is in the range from 17 to 40 wt % based on the total amount of the polymer composition.

In an embodiment, the flame retardant film (3) is made of polypropylene, polycarbonate, polyethylene terephthalate, polybutylene terephthalate, polyphenylene ether, polyetherimide, polyamide, polytetrafluoroethylene, polyethylene, polystyrene, polysulfone, polyvinyl chloride, preferably polyvinyl chloride or polycarbonate, or these polymer blends or copolymers.

In an embodiment, the thickness of the Flame retardant film is between 0.01 and 1 mm, preferably between 0.1 mm and 0.5 mm, more preferably between 0.2 mm-0.3 mm.

In an embodiment, the thickness of the outside shell is between 1.0 and 4 mm, preferably between 1.5 mm and 3 mm, more preferably between 2 and 2.9 mm.

In an embodiment, the glass fiber is a fiber from 100 μm to 20 mm, preferably from 200 μm to 15 mm.

In an embodiment, the polymer composition comprising a pigment comprising an inorganic zinc salt and/or an inorganic barium salt.

Another object of the invention is a 5G base station comprising an antenna housing according to the invention.

Use of a 5G antenna housing according to the claim 1 to 7 to protect an antenna.

It is noted that the invention relates to all possible combinations of features described herein, preferred in particular are those combinations of features that are present in the claims. It will therefore be appreciated that all combinations of embodiments; features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous as it offers a simpler, more economical process for the preparation of the product/composition. Similarly, it is also to be understood that a description on a process comprising certain steps also discloses a process consisting of these steps. The process consisting of these steps may be advantageous as it offers a simpler, more economical process.

When values are mentioned for a lower limit and an upper limit for a parameter, ranges made by the combinations of the values of the lower limit and the values of the upper limit are also understood to be disclosed.

DETAILED DESCRIPTION

Figure 1:
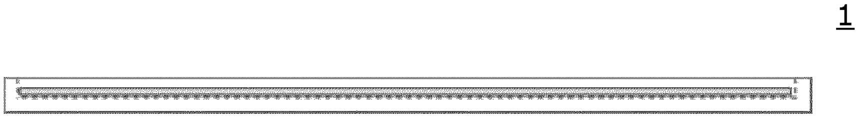
FIG. 1 illustrates the 5G antenna housing assembly according to the invention.
Figure 2:
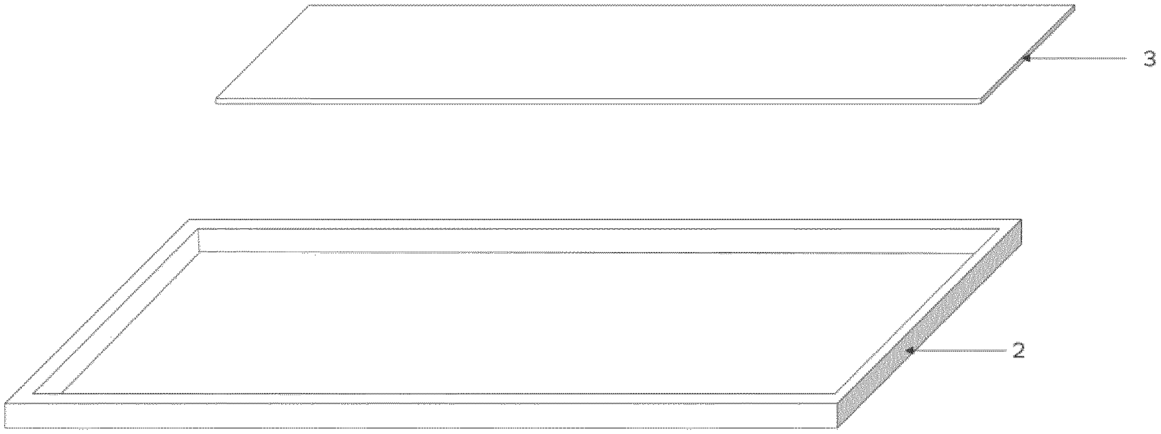
FIG. 2 illustrates the different elements of the 5G antenna housing according to the invention.

The present invention preferably relates to a 5G antenna comprising a 5G antenna housing. More specifically the 5G antenna housing comprises an outside shell (2) with an internal film (3) having at least flame retardant properties of a rating of VTM2 on the surface at proximity of the antenna.

The 5G antenna housing according to the invention is preferably an enclosure around the antenna, in order to protect it from the environment and complies with the following performance:

- High-current Arc ignition: ≤3 according to UL746A,
- Hot wire ignition: ≤3 according to ASTM D3874,
- Flex modulus: >2000 MPa according to ISO178,
- IZOD impact at 23° C.: >10 KJ/m2 according to ISO180,
- IZOD impact at −40° C.: >5 KJ/m2 according to ISO180.
- Passing a falling ball test wherein the falling ball test is performed from m by 200 g ball, Color change (ΔE) after UV 1000 h according to ISO4892-2 inferior to 50 according to GB 11186.2 on color-eye 7000A Outside Shell (2)

The outside shell is made of Fiber glass reinforced polymer which may be Polyethylene (PE) Polypropylene (PP), Polycarbonate (PC), Ethylene based elastomer, Grafted polypropylene or a Combination of those material.

In an embodiment, the thickness of the outside shell is between 1.0 and 4 mm, preferably between 1.5 mm and 3 mm, more preferably between 2 and 2.9 mm.

Polyethylene (PE)

The Polyethylene according to the invention is preferably an ethylene base polymer, wherein the ethylene base polymer may be prepared in one or more reactors, by polymerization of ethylene in the presence of a catalyst and optionally subsequent polymerization of an ethylene-α-olefin mixture.

Polyethylene having preferably a MFR in the range from 0.1 to 100 dg/min as measured according to ISO1133 at 190° C. and 2.16 kg.

In some embodiment, the PE can include one or more other olefin selected from the list comprising grafted polypropylene, polypropylene, polybutylene, polypentene, polyhexene, polyheptene, polyoctene, polynonene, polydecene, or other polyolefin.

In some embodiment, PE can be ethylene and α-olefin copolymer can be selected from the group ethylene and α-olefins having 4-10 carbon atoms, for example 1-butene, 1-pentene, 4-methyl-1-pentene, 1-hexen, 1-heptene, 1-octene and mixtures thereof, preferably the α-olefin in the propylene—α-olefin copolymer is ethylene.

Polycarbonate (PC)

The Polycarbonate (PC) according to the invention is preferably polycarbone composition that comprises:

(i) a first polycarbonate derived from a dihydroxy compound and a carbonate source, comprising repeat units according to formula (1)

(1)

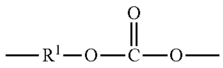

wherein at least 60 percent of the total number of R 1 groups contain aromatic moieties and the balance thereof are aliphatic, alicyclic, or aromatic;

wherein the first polycarbonate further comprises branching groups derived from a first branching agent and end-capping groups derived from an end-capping agent; and wherein the first polycarbonate has a peak melt viscosity of at least 7,000 poise when measured using a parallel plate melt rheology test at a heating rate of 10° C. per minute (° C./min) at a temperature of between 350° C. to 450° C.;

(ii) a second polycarbonate comprising repeat units according to formula (1)

(1)

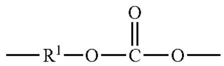

wherein at least 60 percent of the total number of $R^1$ groups contain aromatic moieties and the balance thereof are aliphatic, alicyclic, or aromatic, and wherein the second polycarbonate further comprises a second branching agent; and (iii) a perfluoroalkyl sulfonate salt.

The above polycarbonate having an MFR in the range from 0.1 to 100 dg/min as measured according to ISO1133 at 300° C. and 1.2 kg, Polypropylene The polypropylene according to the invention is preferably a heterophasic propylene copolymer, wherein the heterophasic propylene copolymer may be prepared in one or more reactors, by polymerization of propylene in the presence of a catalyst and optionally subsequent polymerization of an ethylene-α-olefin mixture.

The polypropylene according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; Polypropylene and other Polyolefins, by Ser van der Ven, Studies in Polymer Science 7, Elsevier 1990; WO06/010414, U.S. Pat. Nos. 4,399,054 and 4,472,524. Preferably, the polypropylene is made using Ziegler-Natta catalyst.

The MFI of the polypropylene is in the range from 0.1 to 75 dg/min, preferably in the range from 1 to 59 dg/min, more preferably in the range from 32 to 47 dg/min as measured according to ISO1133 (2.16 kg/230° C.).

In an embodiment, the polypropylene according to the invention comprises a propylene-based matrix and a dispersed ethylene-α-olefin copolymer.

Preferably the amount of the propylene-based matrix is from 60 to 99 wt %, for example from 65 to 95 wt %, for example from 70 to 90 wt %, for example from 75 to 85 wt %, for example from 72 to 87 wt % based on the total amount of the polypropylene.

The melt flow index (MFI) of the propylene-based matrix $MFI_{pp}$ is at least 3 dg/min and at most 120 dg/min, measured according to ISO1133 (2.16 kg/230° C.). $MFI_{pp}$ may be for example at least 40 dg/min, at least 45 dg/min, at least 50 dg/min, at least 55 dg/min or at least 60 dg/min, and/or for example at most 110 dg/min, at most 100 dg/min, at most 90 dg/min or at most 80 dg/min, measured according to ISO1133 (2.16 kg/230° C.).

Preferably the amount of the dispersed ethylene-α-olefin copolymer is from 40 to 1 wt %, for example from 35 to 5 wt %, for example from 30 to 10 wt %, for example from 28 to 13 wt %, based on the total amount of the polypropylene.

The MFI of the dispersed ethylene-α-olefin copolymer ($MFI_{EPR}$) may be for example at least 0.001 dg/min, at least 0.01 dg/min, at least 0.1 dg/min, at least 0.3 dg/min, at least 0.7 dg/min, at least 1 dg/min, and/or for example at most 30 dg/min, at most 20 dg/min, at most 15 dg/min, at most 10 dg/min, at most 5 dg/min, at most 3 dg/min as measured according to ISO1133 (2.16 kg/230° C.).

The total amount of the propylene-based matrix and the dispersed ethylene-α-olefin copolymer is preferably 100 wt %. The amount ratio between the propylene-based matrix and the dispersed ethylene-α-olefin copolymer is preferably in the range from 95:5 to 65:35, preferably from 90:10 to 70:30, preferably from 87:13 to 72:28, more preferably from 85:15 to 75:25.

The amounts of the propylene-based matrix and the dispersed ethylene-α-olefin copolymer may be determined by NMR, as well known in the art.

The propylene-based matrix may consists of a propylene homopolymer and/or a propylene—α-olefin copolymer consisting of at least 70 wt % of propylene and up to 30 wt % of ethylene and/or an α-olefin having 4 to 10 carbon atoms, for example a propylene—α-olefin copolymer consisting of at least 80 wt % of propylene and up to 20 wt % of ethylene and/or an α-olefin having 4 to 10 carbon atoms, for example consisting of at least 90 wt % of propylene and up to 10 wt % of ethylene and/or an α-olefin having 4 to 10 carbon atoms, based on the total amount of the propylene-based matrix.

The α-olefin in the propylene—α-olefin copolymer may be selected from the group ethylene and α-olefins having 4-10 carbon atoms, for example 1-butene, 1-pentene, 4-methyl-1-pentene, 1-hexen, 1-heptene, 1-octene and mixtures thereof, preferably the α-olefin in the propylene—α-olefin copolymer is ethylene.

In an embodiment, the propylene-based matrix is a propylene homopolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

The amount of ethylene in the ethylene-α-olefin copolymer is preferably in the range from 20 to 80 wt % based on the ethylene-α-olefin copolymer, more preferably, the amount of ethylene in the ethylene-α-olefin copolymer is from 30 to 70 wt %, more preferably from 40 to 65 wt %, more preferably from 50 to 65 wt %, even more preferably from 55 to 65 wt %.

Preferably, the α-olefin in the ethylene-α-olefin copolymer is propylene.

The amount of the polypropylene is preferably in the range from 26 to 76 wt %, preferably in the range from 33 to 62 wt %, more preferably in the range from 39 to 53 wt % based on the total amount of the polymer composition.

Ethylene Based Elastomer

The polymer composition in the present invention further comprises an ethylene based elastomer.

The ethylene based elastomer is preferably selected from a group consisting of ethylene-butene copolymer, ethylene-hexene copolymer, ethylene-octene copolymer and mixtures thereof, preferably the polyolefin based elastomer is an ethylene-octene copolymer.

Preferably the density of the ethylene based elastomer is preferably in the range from 0.845 to 0.883 g/cm3, preferably in the range from 0.848 to 0.865 g/cm3, more preferably in the range from 0.853 to 0.860 g/cm3 as measured according to ASTM D792-13.

The MFI of the ethylene based elastomer is in the range from 0.8 to 36 dg/min, preferably in the range from 0.9 to 23 dg/min, more preferably in the range from 0.9 to 13 dg/min, even more preferably in the range from 0.9 to 4.8 dg/minas measured according to ISO1133-1:2011 at 190° C./2.16 kg.

The shore A hardness of the ethylene based elastomer is preferably in the range from 35 to 90, preferably in the range from 42 to 69, more preferably in the range from 47 to 60, most preferably in the range from 50 to 57 as measured according to ASTM D2240-15, 1s.

Ethylene based elastomers which are suitable for use in the current invention are commercially available for example under the trademark EXACT™ available from Exxon Chemical Company of Houston, Texas or under the trademark ENGAGE™ polymers, a line of metallocene catalyzed plastomers available from Dow Chemical Company of Midland, Michigan or under the trademark TAFMER™ available from MITSUI Chemicals Group of Minato Tokyo or under the trademark Fortify™ and Cohere™ from SABIC.

The ethylene based elastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The elastomers may also be prepared using traditional types of heterogeneous multi-sited Ziegler-Natta catalysts.

Preferably, the amount of ethylene incorporated into the polyolefin based elastomer is at least 40 wt %. More preferably, the amount of ethylene incorporated into the polyolefin based elastomer is at least 42 wt %, for example at least 44 wt %. The amount of ethylene incorporated into the polyolefin based elastomer may typically be at most 95 wt %, for example at most 85 wt %, for example at most 75 wt %, for example at most 65 wt %, for example at most 60 wt %, for example at most 58 wt %.

The amount of the ethylene based elastomer is in the range from 15.5 to 28.3 wt %, more preferably in the range from 18.2 to 23.6 wt % based on the total amount of the polymer composition.

Grafted Polypropylene

When at least part of the hydrogen atoms on the main chain of a polypropylene are substituted by a functional group, the polypropylene becomes a grafted polypropylene.

The grafted polypropylene in the present application is preferably a maleic anhydride grafted polypropylene. Preferably the grafted polypropylene comprises from 0.1 to 3.0 wt. % of maleic anhydride functionalities based on the total amount of the grafted polypropylene.

Maleic anhydride grafted polypropylenes are known in the art and for example available from ExxonMobil under the trade name Exxelor™ PO1015 and Exxelor™ PO1020.

It is preferred that the grafted polypropylene is (semi) crystalline.

The MFI of the grafted polypropylene is preferably in the range from 150 to 600 dg/min, more preferably in the range from 290 to 500 dg/min as measured according to ISO1133-1:2011 at 230° C./2.16 kg.

The amount of the grafted polypropylene is in the range from 1.2 to 2.9 wt % based on the total amount of the polymer composition. The inventor of the present application surprisingly found this amount of grafted polypropylene leads to improved falling weight resistance at low temperature.

Glass Fibers

In general, glass fiber is a glassy cylindrical substance where its length is significantly longer than the diameter of its cross section. It is known that adding glass fibers is able to improve the mechanical performance (e.g. strength and stiffness) of polymer resin. The level of performance improvement depends heavily on the properties of the glass fibers, e.g. diameter, length and surface property of the glass fiber.

For the purpose of the present invention, the diameter of the glass fibers is preferably in the range from 100 μm to 20 mm, preferably from 200 μm to 15 mm.

It is also know that long glass fiber (length from 0.5 to 20 mm) is able to provide superior property improvement than short glass fiber (length shorter than 0.5 mm) to the composition. The length of glass fibers in the present invention depends heavily on the process used to prepare the said composition. Preferably the glass fiber in the polymer composition according to the invention are long glass fibers.

In the present invention, the amount of glass fibers is preferably in the range from 17 to 40 wt %, preferably in the range from 25 to 34 wt % based on the total amount of the polymer composition.

Blend of Polymers

In some embodiment, the Polymer composition may be a combination of above material, preferably a combination of polyethylene and grafted polypropylene, a combination of polypropylene, ethylene based elastomer and/or grafted polypropylene.

Optional Additives

The polymer composition may contain the usual additives, for instance nucleating agents and clarifiers, stabilizers, release agents, peroxides, plasticizers, anti-oxidants, lubricants, antistatics, cross linking agents, scratch resistance agents, flame retardants, blowing agents, acid scavengers, recycling additives, anti-microbials, anti-fogging additives, slip additives, anti-blocking additives, polymer processing aids, colorant, pigment and the like. Such additives are well known in the art. The skilled person will know how to choose the type and amount of additives such that they do not detrimentally influence the aimed properties. Preferably the amount of the flame retardant in the polymer composition is at most 25 wt %, preferably at most 15 wt %, even more preferably at most 5 wt % based on the total amount of the polymer composition.

In some embodiment those additives may be loaded in the range from 0.01 to 30 wt % of the all composition.

The polymer composition according to the invention can be prepared by a process known in the art for the preparation of a fiber reinforced composition, for instance: a pultrusion process, a wire-coating process as described in EP 0921919 B1 and EP 0994978 B1, or compounding. The polymer composition prepared in such process is in pellet form.

Process for Making the Outside Shell

The method for producing the outside shell (2) from the polymer resin composition of the present invention is not particular limited to a specific one but can be implement from various process known by the man in the art. For example, injection molding can be done by injecting the polymer composite into a mold. The material is extruded into the antenna cover through barrel and mold in sequence. The injection molding step is performed from 120° C. to 390° C. Extrusion can be done by extruding the polymer composite on an extruder. The material may be extruded into the antenna cover through the feed flow channel, the main flow channel, the transition flow channel, the pressurized flow channel and the forming flow channel in sequence. The extrusion molding step may be performed from 120° C. to 390° C.

Flame Retardant Film (3)

The flame retardant film preferably comprisesat least a polymeric material. The total amount of the polymeric material is preferably in the range from 35 to 90 wt %, more preferably from 45 to 82 wt %, even more preferably from 55 to 75 wt % based on the total amount fo the flame retardant film. Suitable polymeric material includes but is not limited to: polypropylene, polycarbonate, polyethylene terephthalate, polybutylene terephthalate, polyphenylene ether, polyetherimide, polyamide, polytetrafluoroethylene, polyethylene, polystyrene, polysulfone, polyvinyl chloride, and blends thereof, wherein Polypropylene according to the invention is preferably a Polypropylene (PP) having a MFI in the range from 0.1 to 75 dg/min, as measured according to ISO1133 at 230° C./2.16 kg, and a xylene soluble part of the polypropylene is in the range from 0.1 to 35 wt % as measured according to by ISO16152:2005

Polyethylene (PE) having a MFR in the range from 0.1 to 100 dg/min as measured according to ISO1133 at 190° C. and 2.16 kg, Polycarbonate according to the invention is preferably polycarbonate having an MFR in the range from 0.01 to 30 dg/min as measured according to ISO1133 at 300° C. and 1.2 kg polyethylene terephthalate according to the invention is preferably polyethylene terephthalate having weight-averaged molecular weight range from 5000 to 1,000,000 g/mole as determined by gel permeation chromatography using polyethylene terephthalate standards.

polybutylene terephthalate according to the invention is preferably polybutylene terephthalate having weight-averaged molecular weight range from 5000 to 1,000,000 g/mole as determined by gel permeation chromatography using polybutylene terephthalate standards.

Polyphenylene ether according to the invention is preferably polyphenylene ether having weight-averaged molecular weight range from 5000 to 1,000,000 g/mole as determined by gel permeation chromatography using polyphenylene ether standards.

Polyetherimide according to the invention is preferably polyetherimide having weight-averaged molecular weight range from 5000 to 1,000,000 g/mole as determined by gel permeation chromatography using polyetherimide standards.

Polyamide according to the invention is preferably polyamide having weight-averaged molecular weight range from 5000 to 1,000,000 g/mole as determined by gel permeation chromatography using polyamide standards.

Polytetrafluoroethylene according to the invention is preferably polytetrafluoroethylene having a melt viscosity of 100 to $7*10^7$ Pa·s at 380° C.

Polyethylene according to the invention is preferably polyethylene having weight-averaged molecular weight range from 5000 to 1,000,000 g/mole as determined by gel permeation chromatography using polyethylene standards.

Polystyrene according to the invention is preferably polystyrene having weight-averaged molecular weight range from 5000 to 1,000,000 g/mole as determined by gel permeation chromatography using polystyrene standards.

Polysulfone according to the invention is preferably polysulfone having weight-averaged molecular weight range from 5000 to 1,000,000 g/mole as determined by gel permeation chromatography using polysulfone standards.

Polyvinyl chloride according to the invention is preferably polyvinyl chloride degree of polymerization of 400 to 60000 according to GB/T5761-2006.

Blend of material: In some embodiment, the film (3) may be a combination of above material, preferably a blend of polyphenylene ether and polystyrene.

Optional Additives

The Flame retardant Film may contain the usual additives, for instance nucleating agents and clarifiers, stabilizers, release agents, peroxides, plasticizers, anti-oxidants, lubricants, antistatics, cross linking agents, scratch resistance agents, blowing agents, acid scavengers, recycling additives, anti-microbials, anti-fogging additives, slip additives, anti-blocking additives, polymer processing aids, colorant, pigment and the like. Such additives are well known in the art. The skilled person will know how to choose the type and amount of additives such that they do not detrimentally influence the aimed properties. The total amount of those additives is preferably in the range from 0.01 to 30 wt % based on the total amount of the flame retardant film.

The flame retardant film preferably comprises at least one flame retardent agent, wherein suitable flame retardant agent includes but is not limited to bromine compounds(Bromine PC, decabromodiphenyl ether, decabromodiphenyl ethane tetrabromobisphenol A, brominated epoxy resin, and hexabromocyclododecane, and so on.), Halogenated phosphates (halogenated phosphate ester, 1,4-di(2-hydroxyethoxy)-2,3,5,6-Tetrachlorobenzene, 1,4-di(ethoxycarbonylmethoxy)-2,3,5,6-tetrachlorobenzene, tetra(2,3-dibromopropyl) glycol diphosphate, Halogenated phosphoric acid salt, magnesium dihydroxide, Aluminium hydroxide, Zinc borate, antimony trioxide, Red phosphorus, Expandable-graphite, Phosphines, phosphine oxides, phosphonium compounds, phosphonates, phosphites, and phosphate, Melamine and its derivates(including melamine cyanuric acid salt, melamine phosphate, and polyphosphate), Aluminum diethylphosphinate, Phosphazenes, including liner poly(phosphazene)s and cyclicphosphazenes, pyrophosphate piperazine, Potassium-diphenyl sulfone sulfonate, Potassium 1,1,2,2,3,3,4,4,4-nonafluorobutane-1-sulfonate, Sodium 2,4,5-trichlorobenzene-sulphonate, Sodium benzenesulfonate, or the combination of above chemicals wherein the amount of Bromine compounds is preferably in the range from 1 to 5 wt % based on the total amount of the flame retardant film, wherein the amount of Halogenated phosphoric acid salt is preferably in the range from 2 to 30 wt % based on the total amount of the flame retardant film, wherein the amount of magnesium dihydroxide and/or Aluminium hydroxide is preferably in the range from 20 to 60 wt % based on the total amount of the flame retardant film, wherein the amount of Zinc borate and/or antimony trioxide is preferably in the range from 2 to 15 wt % based on the total amount of the flame retardant film, wherein the amount of Red phosphorus and/or Expandable-graphite is preferably in the range from 10% to 30% based on the total amount of the flame retardant film, wherein the amount of Phosphines, phosphine oxides, phosphonium compounds, phosphonates, phosphites, and phosphate, Melamine and its derivates(including melamine cyanuric acid salt, melamine phosphate, and polyphosphate), Aluminum diethylphosphinate, Phosphazenes, including liner poly(phosphazene)s and cyclicphosphazenes, pyrophosphate piperazine is preferably in the range from 2 to 30 wt % based on the total amount of the flame retardant film, wherein the amount of Potassium 1,1,2,2,3,3,4,4,4-nonafluorobutane-1-sulfonate, Sodium 2,4,5-trichlorobenzenesulphonate, Sodium benzenesulfonate is preferably in the range from 0.01 to 2 wt % based on the total amount of the flame retardant film.

The thickness of the Flame retardant film is between 0.01 and 1 mm, preferably between 0.1 mm and 0.5 mm, more preferably between 0.2 mm-0.3 mm.

In a preferred embodiment A, the polymeric material is a polycarbonate and the flame retardant agent is bromine polycarbonate wherein the amount of polycarbonate is in the range from 45 to 70 wt %, preferably from 55 to 65 wt % based on the total amount the flame retardant film, wherein the amount of bromine polycarbonate is in the range from 15 to 45 wt %, preferably from 25 to 35 wt % based on the total amount of the flame retardant film.

In a preferred embodiment B, the polymeric material is a polyvinyl chloride and the the flame retardant agent is antimony trioxide wherein the amount of polyvinyl chloride is in the range from 65 to 95 wt %, preferably from 79 to 90 wt % based on the total amount the flame retardant film, wherein the amount of antimony trioxide is in the range from 3 to 15 wt %, preferably from 5 to 10 wt % based on the total amount of the flame retardant film.

In a preferred embodiment C, the polymeric material is a blend of polyphenylene ether and polystyrene and the the flame retardant agent is a melamine phosphate, wherein the amount of polyphenylene ether is in the range from 45 to 75 wt %, preferably from 55 to 70 wt % based on the total amount the flame retardant film, wherein the amount of polystyrene is in the range from 3 to 10 wt % based on the total amount the flame retardant film, wherein the amount of melamine phosphate is in the range from 3 to 15 wt %, preferably from 5 to 12 wt % based on the total amount of the flame retardant film. Preferably the flame retardant agent further comprise aluminium diethylphosphinate wherein the amount of aluminium diethylphosphinate is in the range from 10 to 20 wt % based on the total amount of the flame retardant film.

The total amount of the polymeric material, optional additives and flame retardant agent is 100 wt % based on the total amount of the flame retardant film.

Process for Making the Flame Retardant Film

The method for producing the flame retardant (3) film from the polymer resin composition of the present invention is not particular limited to a specific one but can be implement from various process known by the man in the art as the one described in US2018215901A1 or in US201407994. For example, molding methods such as the melt extrusion molding method, the solution casting method, the blowing molding method, the solution casting method, the blow molding method and the inflation molding method can be used. Among them, preferred is extrusion molding method from the viewpoint of continuous producing a film includes a step of extrusion molding the polymer resin composition.

Process to Assemble Outside Case and Film Retardant

The FR Films were insert into the outside shell and be connected by any means known by the man in the art as screw, or glue, or heat pressing, or 2 k molding.

EXAMPLES

Materials

Several antenna housing have been made for testing different material according to table 1 in which Ref #0 is not part of the invention.

30YH515 long glass fiber filled polypropylene having FR Rating V0, the tensile modulus of 30YH515 is 7600 Mpa according to ISO 527/1A.

30YH515 comprises:
37% Homo polypropylene with MFR 30 dg/min & 1% xylene soluble part,
30% flame retardant,
30% glass fiber
2% grafted polypropylene having a MFI 200 dg/min
1% stabilizer.

30YK653 long glass fiber filled polypropylene having FR Rating HB, the tensile modulus of 30YH653 is 5100 Mpa according to ISO 527/1A. 30YK653 comprises:
50% Poly(propylene-ethylene) with MFR 60 dg/min & 22% xylene soluble part,
30% glass fiber,
15% Ethylene based elastomer with MFR 1 dg/min,
3% grafted polypropylene having a MFI 350 dg/min,
1.5% stabilizer,
0.5% colorant.

PE30 short glass fiber filled polyethylene having FR Rating HB, the tensile modulus of 30YH653 is 4900 Mpa according to ISO 527/1A.

PE30 comprises:
66.5% Poly(propylene-ethylene) with MFR 15,
30% glass fiber.
2% grafted polypropylene having a MFI 500 dg/min,
1.5% stabilizer FR25A Polycarbonate film having FR Rating VTM0 and V0 @ 0.25 mm.

FR25A is according to the preferred embodiment A.

PVC Foshan Dehe PVC film having FR Rating VTM0 and V0 @ 0.5 mm.

PVC Foshan Dehe PVC film comprises polyvinyl chloride with degree of polymerization of 7000. PVC Foshan Dehe PVC film is according to the preferred embodiment B PPO/PS PPO/PS blend film having FR Rating VTM0 and V0 @ 0.5 mm. PPO/PS blend film is according to the preferred embodiment C PPO/PS blends film comprises:
69.5% polyphenylene ether having weight-averaged molecular weight 60,000 g/mole,
5% polystyrene having weight-averaged molecular weight range from 100,000 g/mole.
25% flame retardant agent,
0.5% stabilizer.

TABLE 1

| | Outside shell | | | | FR Film | | | |
|---|---|---|---|---|---|---|---|---|
| Ref # | Name | Composition | FR rating | Thickness (mm) | Name | Composition | FR rating | Thickness (mm) |
| 0 | 30YH515 | long glass fiber filled polypropylene pellets | V0 | 1.5 | — | — | — | — |

TABLE 1-continued

| Ref # | Outside shell Name | Composition | FR rating | Thickness (mm) | FR Film Name | Composition | FR rating | Thickness (mm) |
|---|---|---|---|---|---|---|---|---|
| 1 | 30YK653 | long glass fiber filled polypropylene pellets | HB | 1.5 | FR25A | Polycarbonate film | V0&VTM0 | 0.25 |
| 2 | 30YK653 | long glass fiber filled polypropylene pellets | HB | 1.5 | PVC | Foshan Dehe PVC film | V0&VTM0 | 0.5 |
| 3 | 30YK653 | long glass fiber filled polypropylene pellets | HB | 1.5 | PPO/PS | PPO/PS blends film | V0&VTM0 | 0.5 |
| 4 | PE30 | short glass fiber filled polyethylene pellets | HB | 2 | FR25A | Polycarbonate film | V0&VTM0 | 0.25 |
| 5 | PE30 | short glass fiber filled polyethylene pellets | HB | 2 | PVC | Foshan Dehe PVC film | V0&VTM0 | 0.5 |
| 6 | PE30 | short glass fiber filled polyethylene pellets | HB | 2 | PPO/PS | PPO/PS blends film | V0&VTM0 | 0.5 |

The outside shell has been made by injection molded using FANUC injection molding machine (S-2000i) at temperature 200° C. for PE 250° C. for PP, 300° C. for PC and 90 S cycle time. The FR film has been made by Extrusion using a PLASMA BMSJ-2500 extruder at temperature 200° C. for PVC, 300° C. for PC and PPO/PS with 50 m/min output.

The FR Films were insert into the outside shell and connected by iron screws.

Tests

Hot wire ignition (HWI) test were performed at room temperature according to ASTM D3874.

High-current Arc ignition (HAI) test were performed at room temperature according to UL746A VTMx, Vx&HB tests were performed according to UL94. Testing is per UL protocol as the following procedure: Flame bars were conditioned for 48 hours at 23° C. and 50% relative humidity as regular aging, as well as for 168 hours at 70° C. for heat aging, respectively.

UV aging test was done according to ISO4892-2 for 1000 h, color was tested according to GB 11186.2.

Falling ball test was done by 550 g ball at 2 m & −40 C. The test was performed on a customized machine. The customized machine comprises two parts: A weight release mechanism and a plaque support.

The weight release mechanism is able to release a metallic ball with 550 gram weight and 50 mm diameter from 2 m height with 0 initial velocity as a free falling object to create falling weight impact on the test plaque.

The plaque support has a square shape with one space in the centre, the outside dimension of the support is 150*150 mm (the outside shell has a dimension of 150*150*2 mm for this measurement) and inside dimension of the dimension is 130*130 mm. The horizontal geometric centre of the outer square superposes with that of the inner square. A plaque was placed horizontally on the plaque support, the horizontal geometric centre of the plaque superposed with that of the support.

The weight release mechanism and the plaque support are positioned in a way that the falling weight impact is created perpendicularly on the plaque surface. The horizontal geometric centre of the plaque superposes with that of the impact point.

The plaque was conditioned in a freezer at −40° C. for at least 4 hours before installation on the plaque support. The whole falling impact operation is completed within 30 secs starting from taking the plaque out of the freezer. 10 test plaques were measure, a pass rating is assigned to sample that none of the 10 test plaques broke during the test.

UV aging test was done according to ISO4892-2 for 1000 h, color was tested on color-eye 7000A according to GB 11186.2. Color change ΔE=(E after aging-E without aging)/E without aging.

IZOD impact tests were performed at room temperature and −40 C according to ISO 180 by Toyoseiki Digital Impact DG-UB equipped with a pendulum of 2 J. The test part was cut from antenna cover on flow direction of melt.

Flexural tests were carried out at room temperature according to ISO 178. The test part was cut from antenna cover on flow direction of melt.

In all the measurements, the tested object is combination of outside shell and FR film. The HAI and HWI measurement were carried out from the side of FR film.

Results

For HAI, HWI, the lower value, the better these performance. The HAI and HWI of film surface is lower than that of without film surface, therefore the FR performance of film surface is better than that of 30YK653 antenna cover, which consist with the film and 30YK653 FR rating. The film rating is V0 @ 0.25 mm, while 30YK653 FR rating is HB @ 2.5 mm.

TABLE 2

| performance of antenna housings Ref # | 0 | 1 | 2 | 3 | 4 | 5 | 6 |
|---|---|---|---|---|---|---|---|
| Falling ball test @ −40 C. | Fail (Crack) | Pass | Pass | Pass | Pass | Pass | pass |
| Color change(ΔE) after UV of outside surface | 4.6 | 1.44 | 1.43 | 1.5 | 1.23 | 1.23 | 1.23 |
| Hot wire ignition (HWI) Internal surface Rating | 1 | 1 | 1 | 1 | 1 | 1 | 1 |
| Hot wire ignition (HWI) Outside surface Rating | 1 | 2 | 2 | 2 | 2 | 2 | 2 |

TABLE 2-continued

| performance of antenna housings | | | | | | | |
|---|---|---|---|---|---|---|---|
| Ref # | 0 | 1 | 2 | 3 | 4 | 5 | 6 |
| High-current Arc ignition (HAI) Internal surface Rating | 1 | 0 | 0 | 1 | 0 | 0 | 1 |
| High-current Arc ignition (HAI) Outside surface Rating | 1 | 1 | 1 | 1 | 1 | 1 | 1 |
| Flex modulus (Mpa) Flow direction | 4370 | 4100 | 4100 | 4100 | 3200 | 3200 | 3200 |
| IZOD impact @ 23 C. (KJ/m2) Flow direction | 22 | 33 | 33 | 33 | 30 | 30 | 30 |
| IZOD impact @ −40 C. (KJ/m2) Flow direction | 10 | 16 | 16 | 16 | 15 | 15 | 15 |
| Falling ball @ −40 C. 550 g 2 m | Fail | Pass | Pass | Pass | Pass | Pass | pass |

The antenna housing 30YH515, long glass fiber filled polypropylene (Ref #0, not according to the invention), comprises a large amount of Flame retardant additive allowing to reach V0. However, the high amount of FR additive has the disadvantage to break the balance of property in particular between impact resistance and stiffness. As a result, 30YH515 does not pass any of the falling ball test which are required to have an efficient antenna housing.

The antenna housings according to the invention (ref #1 to 6) pass all test, even so the HAI performance of the internal surface is better that the one of Ref #0 when Polycarbonate film or PVC film were used and identical when PPO/PS blends film has been used.

Furthermore, example according to the invention Ref #1 to 6 showed better UV aging performance, while Ref #0 showed a bigger color change after UV aging. It should be caused by the big color change of FR additive after UV aging.

The invention claimed is:

1. A 5G antenna housing for a 5G antenna, the 5G antenna housing comprising:
- (a) an outside shell made of a polymer composition comprising at least:
- a polymer selected from: polyethylene (PE), polycarbonate (PC), polypropylene (PP), ethylene based elastomer, grafted polypropylene, and a combination thereof, and glass fiber, and
- (b) a flame retardant film having a rating of at least VTM2 according to UL94 and placed on an inner surface of the outside shell, such that the flame retardant film can be between the outside shell and the 5G antenna,
- wherein the 5G antenna housing has:
- a high-current arc ignition of ≤3 determined according to UL746A,
  - a hot wire ignition of ≤3 determined according to ASTM D3874,
  - a flex modulus of >2000 MPa determined according to ISO178,
  - an IZOD impact at 23° C. of >10 $KJ/m^2$ determined according to ISO180,
  - an IZOD impact at −40° C. of >5 $KJ/m^2$ determined according to ISO180,
  - a color change (ΔE) after UV 1000 h determined according to ISO4892-2 of less than 50 according to GB 11186.2 on color-eye 7000A, and
- wherein the 5G antenna housing passes a falling ball test carried out at a height of greater than or equal to 0.5 meter with a ball having a weight of greater than or equal to 200 grams.

2. The 5G antenna housing according to claim 1, wherein the polymer of the polymer composition is:
- a polyethylene (PE) having an MFR of 0.1 to 100 dg/min as measured according to ISO1133 at 190° C. and 2.16 kg, or
  - a polycarbonate (PC) having an MFR of 0.1 to 100 dg/min as measured according to ISO1133 at 300° C. and 1.2 kg, or
- the polymer is one or more of:
  - a polypropylene (PP) having a MFI of 0.1 to 75 dg/min, as measured according to ISO1133 at 230° C./2.16 kg, and a xylene soluble part of the polypropylene is 0.1 to 35 wt % as measured according to ISO16152:2005,
  - an ethylene based elastomer having a MFI of 0.2 to 36 dg/min, as measured according to ISO1133-1:2011 at 190° C./2.16 kg, or
  - a grafted polypropylene having a MFI of 150 to 600 dg/min, as measured according to ISO1133-1:2011 at 230° C./2.16 kg.

3. The 5G antenna housing according to claim 2, wherein the polymer composition includes the polypropylene (PP) having the MFI of 0.1 to 75 dg/min, and an amount of the polypropylene is 29.6 to 79.8 wt % based on a total amount of the polymer composition.

4. The 5G antenna housing according to claim 2, wherein the polymer composition includes the grafted polypropylene having the MFI of 150 to 600 dg/min, and an amount of the grafted polypropylene is 1.2 to 3 wt % based on the total amount of the polymer composition.

5. The 5G antenna housing according to claim 2, wherein the polymer composition includes the ethylene based elastomer having the MFI of 0.2 to 36 dg/min, and an amount of the ethylene based elastomer is 3.2 to 28.3 wt % based on the total amount of the polymer composition.

6. The 5G antenna housing according to claim 1, wherein an amount of the glass fiber is 17 to 40 wt % based on a total amount of the polymer composition.

7. The 5G antenna housing according to claim 1, wherein the flame retardant film is made of polypropylene, polycarbonate, polyethylene terephthalate, polybutylene terephthalate, polyphenylene ether, polyetherimide, polyamide, polytetrafluoroethylene, polyethylene, polystyrene, polysulfone, polyvinyl chloride, or a combination thereof.

8. The 5G antenna housing according to claim 1, wherein a thickness of the flame retardant film is between 0.01 millimeter and 1 millimeter.

9. The 5G antenna housing according to claim 1, wherein a thickness of the outside shell is between 1.0 millimeter and 4 millimeters.

10. The 5G antenna housing according to claim 1, wherein a diameter of the glass fiber is 100 μm to 20 mm.

11. The 5G antenna housing according to claim 1, wherein the polymer composition further comprises a pigment, the pigment comprising an inorganic zinc salt and/or an inorganic barium salt.

12. A 5G base station comprising an antenna housing according to the claim 1.

13. A 5G antenna housing (1) comprising:

(a) an outside shell made of a polymer composition comprising at least:

a polymer selected from a polyethylene (PE), a polycarbonate (PC), a polypropylene (PP), an ethylene based elastomer, grafted polypropylene, and a combination thereof, and glass fiber, and (b) a flame retardant film on the outside shell, the flame retardant film comprising a polymeric material and a flame retardant, wherein the polymeric material in the flame retardant film is a polyvinyl chloride and the flame retardant is antimony trioxide, and wherein an amount of the polyvinyl chloride is 65 to 95 wt %, and an amount of the antimony trioxide is 3 to 15 wt %, each based on a total amount of the flame retardant film.

14. A 5G antenna housing comprising:

(a) an outside shell made of a polymer composition comprising at least:

a polymer selected from a polyethylene (PE), a polycarbonate (PC), a polypropylene (PP), an ethylene based elastomer, grafted polypropylene, and a combination thereof, and glass fiber, and (b) a flame retardant film on the outside shell, the flame retardant film comprising a polymeric material and a flame retardant, wherein, the polymeric material in the flame retardant film is a blend of polyphenylene ether and a polystyrene and the flame retardant is melamine phosphate, wherein an amount of the polyphenylene ether is 45 to 75 wt %, an amount of the polystyrene is 3 to 10 wt %, and an amount of the melamine phosphate is 3 to 15 wt %, each based on a total amount of the flame retardant film.

15. The 5G antenna housing of claim 14, wherein the flame retardant further comprises aluminium diethylphosphinate, and an amount of the aluminium diethylphosphinate is 10 to 20 wt % based on a total amount of the flame retardant film.

* * * * *